US009470184B2

(12) United States Patent
Kihara et al.

(10) Patent No.: US 9,470,184 B2
(45) Date of Patent: Oct. 18, 2016

(54) EXHAUST GAS RECIRCULATION CONTROL SYSTEM OF ENGINE

(71) Applicant: Mazda Motor Corporation, Aki-gun, Hiroshima (JP)

(72) Inventors: Tomoyuki Kihara, Aki-gun (JP); Daishi Ikeda, Hatsukaichi (JP); Yosuke Honda, Higashihiroshima (JP); Takashi Hatano, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 128 days.

(21) Appl. No.: 14/470,828

(22) Filed: Aug. 27, 2014

(65) Prior Publication Data

US 2015/0089942 A1 Apr. 2, 2015

(30) Foreign Application Priority Data

Sep. 30, 2013 (JP) ................. 2013-204096

(51) Int. Cl.
*F02B 33/44* (2006.01)
*F02M 25/07* (2006.01)
(Continued)

(52) U.S. Cl.
CPC ...... *F02M 25/0709* (2013.01); *F02B 29/0406* (2013.01); *F02D 41/0072* (2013.01); *F02D 41/18* (2013.01); *F02D 41/221* (2013.01); *F02M 26/05* (2016.02); *F02M 26/06* (2016.02); *F02M 26/24* (2016.02); *F02M 26/25* (2016.02);
(Continued)

(58) Field of Classification Search
CPC .............. F02M 25/0709; F02M 25/0707; F02M 25/0728; F02M 25/0732; F02M 25/0713; F02M 25/0718; F02B 29/0406; F02D 41/0072; F02D 41/18; F02D 41/221; F02D 13/0207; F02D 41/1448; F02D 2041/0075; F02D 2200/0406
USPC ........ 60/605.2; 701/108; 123/568.11, 568.12
See application file for complete search history.

(56) References Cited

U.S. PATENT DOCUMENTS 7,836,693 B2 * 11/2010 Fujita .................. F02D 41/0052
60/605.2
8,006,494 B2 * 8/2011 Nagae ................. F02D 41/0052
60/605.2
(Continued)

FOREIGN PATENT DOCUMENTS

JP  2007315371 A  12/2007
JP  2008169724 A  7/2008

*Primary Examiner* — Thai Ba Trieu
(74) *Attorney, Agent, or Firm* — Alleman Hall McCoy Russell & Tuttle LLP

(57) ABSTRACT

An exhaust gas recirculation control device of an engine includes an exhaust turbocharger having a turbine disposed in an exhaust passage and a compressor disposed in an intake passage, low-pressure and high-pressure EGR passages connecting the exhaust passage downstream of the turbine to the intake passage upstream of the compressor and connecting the exhaust passage upstream of the turbine with the intake passage downstream of the compressor, respectively, low-pressure and high-pressure EGR valves disposed in the low-pressure and high-pressure EGR passages and for changing cross-sectional areas thereof, respectively, a valve control device for controlling openings of the low-pressure and high-pressure EGR valves, a total intake gas amount detector for detecting a total intake gas amount, a fresh air amount detector for detecting a fresh air amount, and a pressure difference detector for detecting a pressure difference between the exhaust and intake passage sides of the high-pressure EGR valve.

6 Claims, 5 Drawing Sheets

(51) Int. Cl.
  *F02D 41/00* (2006.01)
  *F02D 41/18* (2006.01)
  *F02D 41/22* (2006.01)
  *F02B 29/04* (2006.01)
  *F02D 41/14* (2006.01)
  *F02D 13/02* (2006.01)

(52) U.S. Cl.
  CPC ....... *F02D13/0207* (2013.01); *F02D 41/1448* (2013.01); *F02D 2041/0075* (2013.01); *F02D 2200/0406* (2013.01); *F02M 26/10* (2016.02); *F02M 26/15* (2016.02); *Y02T 10/146* (2013.01); *Y02T 10/47* (2013.01)

(56) References Cited

U.S. PATENT DOCUMENTS

| | | | | |
|---|---|---|---|---|
| 8,033,272 B2* | 10/2011 | Morizane | F02B 37/04 | 123/565 |
| 8,346,462 B2* | 1/2013 | Nakamura | F02D 41/0052 | 60/605.2 |
| 8,646,271 B2* | 2/2014 | Yasui | F02D 41/0047 | 60/605.2 |
| 8,794,219 B2* | 8/2014 | Yasui | F02D 41/005 | 60/605.2 |
| 9,010,113 B2* | 4/2015 | Harima | F02M 25/0702 | 60/605.2 |
| 2007/0246028 A1 | 10/2007 | Fujita et al. | | |
| 2009/0038308 A1* | 2/2009 | Nagae | F02D 41/0055 | 60/605.2 |
| 2010/0050999 A1* | 3/2010 | Murata | F02D 41/0052 | 60/605.2 |
| 2011/0308503 A1* | 12/2011 | Yasui | F02D 41/005 | 123/568.21 |
| 2011/0313634 A1* | 12/2011 | Yasui | F02D 41/0047 | 701/102 |
| 2012/0095664 A1* | 4/2012 | Nakamura | F02D 41/0052 | 701/102 |
| 2012/0111000 A1* | 5/2012 | Harima | F02M 25/0707 | 60/605.2 |
| 2012/0144806 A1* | 6/2012 | Hamamatsu | F02M 25/0707 | 60/278 |
| 2012/0216774 A1* | 8/2012 | Oba | F02D 41/005 | 123/305 |
| 2012/0216775 A1* | 8/2012 | Iwai | F02D 41/0057 | 123/305 |
| 2012/0216776 A1* | 8/2012 | Nagatsu | F02D 13/0234 | 123/305 |
| 2013/0139795 A1* | 6/2013 | Saitoh | F02M 25/0702 | 123/568.16 |
| 2014/0060489 A1* | 3/2014 | Iwai | F02M 25/0752 | 123/478 |
| 2014/0060493 A1* | 3/2014 | Iwai | F02M 25/0731 | 123/478 |
| 2014/0130483 A1* | 5/2014 | Miyake | F02M 25/0755 | 60/285 |
| 2014/0352298 A1* | 12/2014 | Nogawa | F02M 25/0704 | 60/605.2 |
| 2015/0083072 A1* | 3/2015 | Nagatsu | F02D 41/005 | 123/27 R |
| 2015/0114342 A1* | 4/2015 | Iwai | F02B 29/0418 | 123/305 |

* cited by examiner

EXHAUST GAS RECIRCULATION CONTROL SYSTEM OF ENGINE

BACKGROUND

The present invention relates to an exhaust gas recirculation control device of an engine.

Conventionally, it has been known to provide a high-pressure exhaust gas recirculation (EGR) passage and a low-pressure EGR passage to recirculate a part of exhaust gas from an engine, from an exhaust passage to an intake passage. For example, JP2007-315371A discloses such a configuration. The high-pressure EGR passage connects a part of the exhaust passage upstream of a turbine of an exhaust turbocharger disposed therein, to a part of the intake passage downstream of a compressor of the exhaust turbocharger. Moreover, the low-pressure EGR passage connects a part of the exhaust passage downstream of the turbine to a part of the intake passage upstream of the compressor. A low-pressure EGR valve for changing a cross-sectional area of the low-pressure EGR passage is disposed in the low-pressure EGR passage, and a high-pressure EGR valve for changing a cross-sectional area of the high-pressure EGR passage is disposed in the high-pressure EGR passage. Normally, an opening of the low-pressure EGR valve is controlled so that an amount of exhaust gas of the engine recirculated by the low-pressure EGR passage becomes a low-pressure EGR target recirculation amount set in advance, and an opening of the high-pressure EGR valve is controlled so that an amount of exhaust gas recirculated by the high-pressure EGR passage becomes a high-pressure EGR target recirculation amount set in advance.

In JP2007-315371A, an actual exhaust gas recirculation amount is calculated by subtracting an intake air amount (fresh air amount) from a total amount of intake gas introduced into the engine. Moreover, JP2008-169724A discloses a configuration in which a high-pressure EGR passage is provided (a low-pressure EGR passage is not provided) and a high-pressure EGR valve is provided therein, and an actual amount of exhaust gas recirculated in high-pressure by the high-pressure EGR passage (actual high-pressure recirculation amount) is calculated based on a pressure difference on the upstream side and the downstream side of the high-pressure EGR valve and also an opening of the high-pressure EGR valve.

Meanwhile, in a case of performing a failure diagnosis of the low-pressure EGR valve, when the exhaust gas is recirculated only by the low-pressure EGR passage while the engine is in a normal operation, an actual low-pressure recirculation amount calculated by subtracting the fresh air amount from the total amount of intake gas introduced into the engine as JP2007-315371A is compared with the low-pressure EGR target recirculation amount. If the actual low-pressure recirculation amount significantly deviates from the low-pressure EGR target recirculation amount, the actual low-pressure recirculation amount is determined to be abnormal, and in this case, the low-pressure EGR valve can be determined as broken.

On the other hand, in a case of performing a failure diagnosis of the high-pressure EGR valve, while the engine is in the normal operation, the actual high-pressure recirculation amount calculated based on the pressure difference on the upstream side and the downstream side of the high-pressure EGR valve and also an actual opening of the high-pressure EGR valve as JP2008-169724A is compared with the high-pressure EGR target recirculation amount. If the actual high-pressure recirculation amount significantly deviates from the high-pressure EGR target recirculation amount, the actual high-pressure recirculation amount is determined to be abnormal, and in this case, the high-pressure EGR valve can be determined as broken.

However, in the case of performing the failure diagnosis of the high-pressure EGR valve, since a pressure of the high-pressure EGR valve on the exhaust passage side varies greatly due to exhaust gas pulsation, it is difficult to accurately obtain the pressure difference on the upstream side and the downstream side of the high-pressure EGR valve, and thus, the reliability of the determination result of whether the actual high-pressure recirculation amount is normal/abnormal, in other words, the reliability of the failure diagnosis of the high-pressure EGR valve, is low. On the other hand, on the intake side, since the pulsation is not strong, the total intake gas amount and the fresh air amount can be obtained comparatively accurately, and the reliability of the determination result of whether the actual low-pressure recirculation amount is normal/abnormal, in other words, the reliability of the failure diagnosis of the low-pressure EGR valve, is high.

SUMMARY

The present invention is made in view of the above situations and aims to improve the reliability of a failure diagnosis of a high-pressure EGR valve to an equivalent level to the reliability of a failure diagnosis of a low-pressure EGR valve.

According to one aspect of the present invention, an exhaust gas recirculation control device of an engine is provided. The exhaust gas recirculation control device includes an exhaust turbocharger, a low-pressure EGR passage, a low-pressure EGR valve, a high-pressure EGR passage, a high-pressure EGR valve, and a valve control device. The exhaust turbocharger has a turbine disposed in an exhaust passage of the engine and a compressor disposed in an intake passage. The low-pressure EGR passage connects a part of the exhaust passage downstream of the turbine to a part of the intake passage upstream of the compressor. The low-pressure EGR valve is disposed in the low-pressure EGR passage and changes a cross-sectional area of the low-pressure EGR passage. The high-pressure EGR passage connects a part of the exhaust passage upstream of the turbine to a part of the intake passage downstream of the compressor. The high-pressure EGR valve is disposed in the high-pressure EGR passage and changes a cross-sectional area of the high-pressure EGR passage. The valve control device controls openings of the low-pressure EGR valve and the high-pressure EGR valve so that an amount of exhaust gas of the engine recirculated by the low-pressure EGR passage becomes a low-pressure EGR target recirculation amount and an amount of exhaust gas of the engine recirculated by the high-pressure EGR passage becomes a high-pressure EGR target recirculation amount, respectively. Note that the low-pressure and high-pressure EGR target recirculation amounts are set in advance according to an operating state of the engine.

The exhaust gas recirculation control device also includes a total intake gas amount detector, a fresh air amount detector, and a pressure difference detector. The total intake gas amount detector detects a total amount of intake gas introduced into the engine, the fresh air amount detector detects an amount of fresh air introduced into the engine, and the pressure difference detector detects a pressure difference between the exhaust passage side and the intake passage side of the high-pressure EGR valve in the high-pressure EGR passage. While the engine is in a normal operation, when the exhaust gas is recirculated by the low-pressure EGR passage and the high-pressure EGR passage, the valve control device determines whether an actual total recirculation amount is normal/abnormal by comparing the actual total recirculation amount with a total target recirculation amount that is the sum of the low-pressure EGR target recirculation amount and the high-pressure EGR target recirculation amount, and the valve control device provisionally determines whether an actual high-pressure recirculation amount is normal/abnormal by comparing the actual high-pressure recirculation amount with the high-pressure EGR target recirculation amount. Note that the actual total recirculation amount is calculated by subtracting the fresh air amount detected by the fresh air amount detector, from the total intake gas amount detected by the total intake gas amount detector, and the actual high-pressure recirculation amount is calculated based on the pressure difference detected by the pressure difference detector and an actual opening of the high-pressure EGR valve. While the engine is in the normal operation, when the exhaust gas is recirculated only by the low-pressure EGR passage, the valve control device determines whether an actual low-pressure recirculation amount is normal/abnormal by comparing the actual low-pressure recirculation amount with the low-pressure EGR target recirculation amount. Note that the actual low-pressure recirculation amount is calculated by subtracting the fresh air amount detected by the fresh air amount detector, from the total intake gas amount detected by the total intake gas amount detector. Based on the determination result of whether the actual total recirculation amount is normal/abnormal and the determination result whether the actual low-pressure recirculation amount is normal/abnormal, the valve control device reviews the provisional determination result of whether the actual high-pressure recirculation amount is normal/abnormal, and non-provisionally determines whether the actual high-pressure recirculation amount is normal/abnormal.

With the above configuration, when the exhaust gas is recirculated only by the low-pressure EGR passage, whether the actual low-pressure recirculation amount is normal/abnormal is determined by comparing the actual low-pressure recirculation amount with the low-pressure EGR target recirculation amount, the actual low-pressure recirculation amount calculated by subtracting the fresh air amount detected by the fresh air amount detector from the total intake gas amount (the sum of the fresh air amount and the amount of exhaust gas recirculated by the low-pressure EGR passage) detected by the total intake gas amount detector. Thus, the reliability of this determination is high; whereas, the reliability of the provisional determination of whether the actual high-pressure recirculation amount is normal/abnormal is low. However, when the exhaust gas is recirculated by the low-pressure EGR passage and the high-pressure EGR passage, whether the actual total recirculation amount is normal/abnormal is determined by comparing the actual total recirculation amount with the total target recirculation amount, the actual total recirculation amount calculated by subtracting the fresh air amount detected by the fresh air amount detector from the total intake gas amount (the sum of the fresh air amount and the total amount of exhaust gas recirculated by the low-pressure and high-pressure EGR passages) detected by the total intake gas amount detector. Thus, the reliability of this determination is high, similar to the determination of whether the actual low-pressure recirculation amount is normal/abnormal when the exhaust gas is recirculated only by the low-pressure EGR passage. As a result, based on the determination result of whether the actual total recirculation amount is normal/abnormal and the determination result of whether the actual low-pressure recirculation amount is normal/abnormal, by reviewing the provisional determination result of whether the actual high-pressure recirculation amount is normal/abnormal and non-provisionally determining whether the actual high-pressure recirculation amount is normal/abnormal, the reliability of the non-provisional determination of whether the actual high-pressure recirculation amount is normal/abnormal becomes high. Therefore, the reliability of a failure diagnosis of the high-pressure EGR valve can be improved to an equivalent level to the reliability of a failure diagnosis of the low-pressure EGR valve.

In a case where the actual total recirculation amount is determined as normal, the actual high-pressure recirculation amount is provisionally determined as normal, and the actual low-pressure recirculation amount is determined as abnormal, in the non-provisional determination, the valve control device may correct the provisional determination result that the actual high-pressure recirculation amount is normal, to be abnormal.

Specifically, when the actual total recirculation amount is normal and the actual low-pressure recirculation amount is abnormal, the actual high-pressure recirculation amount should be abnormal; however, the provisional determination result of the actual high-pressure recirculation amount is normal. Since the reliabilities of the determination results of the actual total recirculation amount and the actual low-pressure recirculation amount are high, the provisional determination result that the actual high-pressure recirculation amount is normal is corrected to be abnormal. Note that in the case where both of the actual low-pressure recirculation amount and the actual high-pressure recirculation amount are abnormal, the actual total recirculation amount may be normal when the actual low-pressure recirculation amount is smaller than the low-pressure EGR target recirculation amount and the actual high-pressure recirculation amount is larger than the high-pressure EGR target recirculation amount or when the actual low-pressure recirculation amount is larger than the low-pressure EGR target recirculation amount and the actual high-pressure recirculation amount is smaller than the high-pressure EGR target recirculation amount.

In a case where the actual total recirculation amount is determined as normal, the actual high-pressure recirculation amount is provisionally determined as abnormal, and the actual low-pressure recirculation amount is determined as normal, in the non-provisional determination, the valve control device may correct the provisional determination result that the actual high-pressure recirculation amount is abnormal, to be normal.

Specifically, since both of the actual total recirculation amount and the actual low-pressure recirculation amount are normal, the actual high-pressure recirculation amount should be normal; however, the provisional determination result of the actual high-pressure recirculation amount is abnormal. Thus, the provisional determination result that the actual high-pressure recirculation amount is abnormal is corrected to be normal.

In a case where the actual total recirculation amount is determined as abnormal, the actual high-pressure recirculation amount is provisionally determined as normal, and the actual low-pressure recirculation amount is determined as normal, in the non-provisional determination, the valve control device may correct the provisional determination result that the actual high-pressure recirculation amount is normal, to be abnormal.

Specifically, since the actual total recirculation amount is abnormal and the actual low-pressure recirculation amount is normal, the actual high-pressure recirculation amount should be abnormal; however, the provisional determination result of the actual high-pressure recirculation amount is normal. Thus, the provisional determination result that the actual high-pressure recirculation amount is normal is corrected to be abnormal.

In a case where the actual total recirculation amount is determined as abnormal, the actual high-pressure recirculation amount is provisionally determined as normal, and the actual low-pressure recirculation amount is determined as abnormal, when the actual total recirculation amount is smaller than the total target recirculation amount and the actual low-pressure recirculation amount is larger than the low-pressure EGR target recirculation amount, or when the actual total recirculation amount is larger than the total target recirculation amount and the actual low-pressure recirculation amount is smaller than the low-pressure EGR target recirculation amount, in the non-provisional determination, the valve control device may correct the provisional determination result that the actual high-pressure recirculation amount is normal, to be abnormal.

Specifically, in the case where both of the actual total recirculation amount and the actual low-pressure recirculation amount are abnormal, when the actual total recirculation amount is smaller than the total target recirculation amount and the actual low-pressure recirculation amount is larger than the low-pressure EGR target recirculation amount, the actual high-pressure recirculation amount should be significantly smaller than the high-pressure EGR target recirculation amount and be abnormal. Alternatively, when both of the actual total recirculation amount and the actual low-pressure recirculation amount are abnormal, the actual total recirculation amount is larger than the total target recirculation amount and the actual low-pressure recirculation amount is smaller than the low-pressure EGR target recirculation amount, the actual high-pressure recirculation amount should be significantly larger than the high-pressure EGR target recirculation amount and be abnormal. However, the provisional determination result of the actual high-pressure recirculation amount is normal. Thus, the provisional determination result that the actual high-pressure recirculation amount is normal is corrected to be abnormal.

In a case where the actual total recirculation amount is determined as abnormal, the actual high-pressure recirculation amount is provisionally determined as abnormal, and the actual low-pressure recirculation amount is determined as abnormal, when the actual total recirculation amount is smaller than the total target recirculation amount and the actual low-pressure recirculation amount is smaller than the low-pressure EGR target recirculation amount, or when the actual total recirculation amount is larger than the total target recirculation amount and the actual low-pressure recirculation amount is larger than the low-pressure EGR target recirculation amount, in the non-provisional determination, the valve control device may correct the provisional determination result that the actual high-pressure recirculation amount is abnormal, to be normal.

Specifically, in the case where both of the actual total recirculation amount and the actual low-pressure recirculation amount are abnormal, when the actual total recirculation amount is smaller than the total target recirculation amount and the actual low-pressure recirculation amount is smaller than the low-pressure EGR target recirculation amount or when the actual total recirculation amount is larger than the total target recirculation amount and the actual low-pressure recirculation amount is larger than the low-pressure EGR target recirculation amount, there is a high possibility that the actual high-pressure recirculation amount is normal, but the provisional determination result of the actual high-pressure recirculation amount is abnormal. Thus, the provisional determination result that the actual high-pressure recirculation amount is abnormal is corrected to be normal.

DETAILED DESCRIPTION OF EMBODIMENT

Hereinafter, one embodiment of the present invention is described in detail with reference to the appended drawings.

Figure 1:
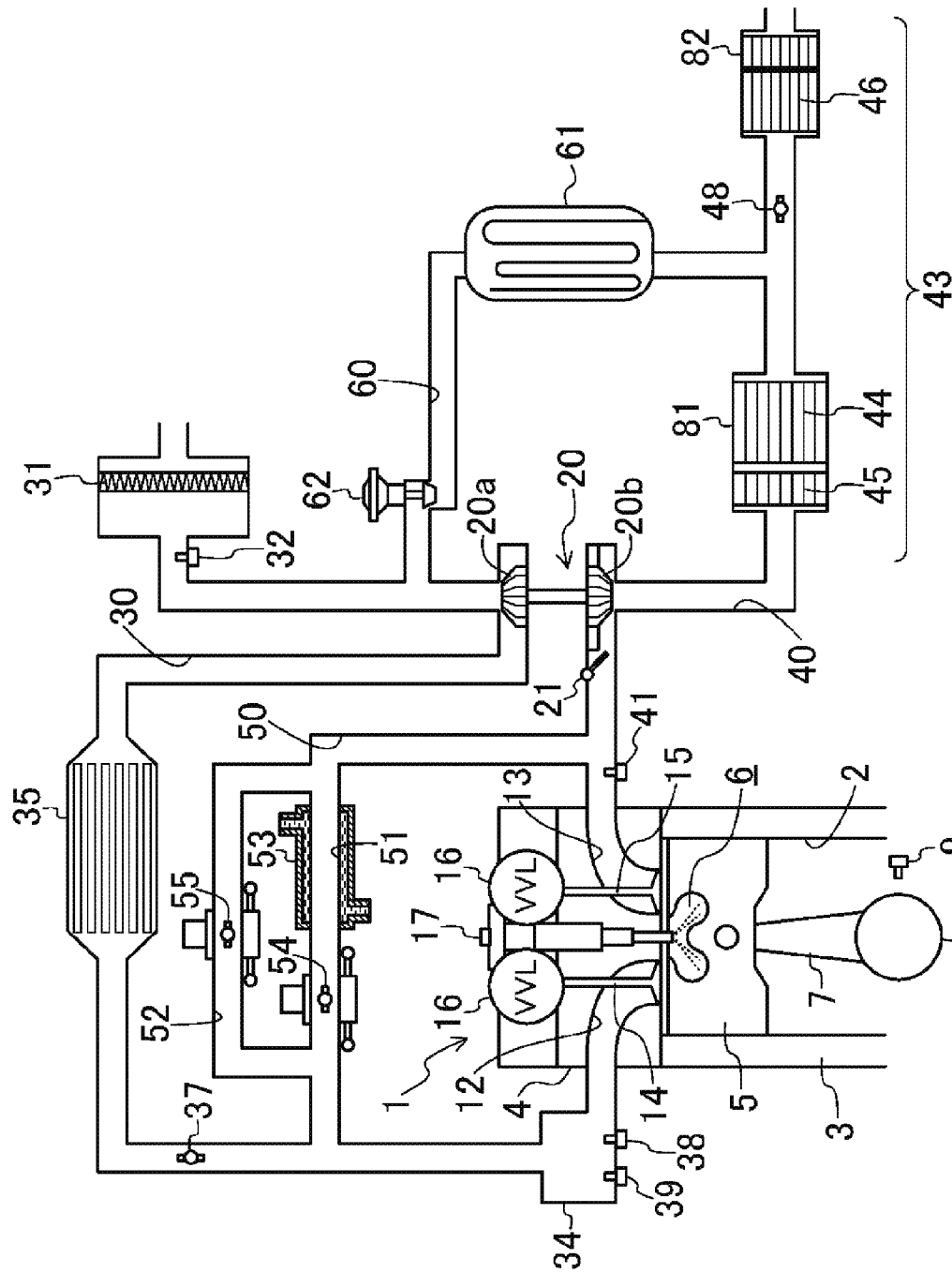
FIG. 1 is a schematic view illustrating a configuration of an engine controlled by an exhaust gas recirculation control device according to one embodiment of the present invention.

FIG. 1 is a schematic view illustrating a configuration of an engine 1 controlled by an exhaust gas recirculation control device of this embodiment. The engine 1 is a diesel engine installed in a vehicle, and includes a cylinder block 3 formed with a plurality of cylinders 2 (only one is illustrated in FIG. 1), and a cylinder head 4 disposed on the cylinder block 3. A piston 5 is reciprocatably fitted into each of the cylinders 2 of the engine 1, and a deep-bowl combustion chamber 6 is formed in a top face of the piston 5. The piston 5 is coupled to a crankshaft 8 via a connecting rod 7. The engine 1 is provided with an engine speed sensor 9 for detecting a speed of the engine 1 by detecting a rotational angular position of the crankshaft 8.

In the cylinder head 4, an intake port 12 and an exhaust port 13 are formed for each cylinder 2, and an intake valve 14 for opening and closing an opening of the intake port 12 on the combustion chamber 6 side and an exhaust valve 15 for opening and closing an opening of the exhaust port 13 on the combustion chamber 6 side are disposed.

Moreover, injectors 17 for injecting fuel are provided in the cylinder head 4. Each injector 17 is arranged such that its fuel injection port is oriented toward an inside of the combustion chamber 6 from a ceiling face of the combustion chamber 6, and to directly inject the fuel into the combustion chamber 6 near a compression top dead center.

The engine 1 is provided with variable valve lift mechanisms (hereinafter, referred to as VVL) 16 for adjusting lifts of the intake and exhaust valves 14 and 15. The VVLs 16 can respectively adjust the lifts of the intake and exhaust valves 14 and 15 so that the valves are fully closed or substantially fully closed.

An intake passage 30 is connected to one side face of the engine 1 to communicate with the intake ports 12 of the respective cylinders 2. An air cleaner 31 for filtering intake air is disposed in an upstream end part of the intake passage 30, and the intake air filtered by the air cleaner 31 is supplied to each combustion chamber 6 of the cylinder 2 via the intake passage 30 and the intake port 12.

An airflow sensor 32 for detecting a flow rate of the intake air introduced into the intake passage 30 is disposed in the intake passage 30, near a downstream side of the air cleaner 31. Moreover, a surge tank 34 is disposed in the intake passage 30, near its downstream end. A part of the intake passage 30 downstream of the surge tank 34 is formed to be independent passages extending to the respective cylinders 2 and a downstream end of each independent passage is connected to the intake port 12 of the cylinder 2.

Further, a compressor 20a of an exhaust turbocharger 20 is disposed in the intake passage 30, between the airflow sensor 32 and the surge tank 34. The intake air is turbocharged by the operation of the compressor 20a.

Furthermore, an intercooler 35 for cooling air compressed by the compressor 20a and an intake shutter valve 37 are disposed in the intake passage 30, between the compressor 20a of the exhaust turbocharger 20 and the surge tank 34, in this order from the upstream side. The intake shutter valve 37 adjusts an amount of intake air to the combustion chambers 6 of the respective cylinders 2, by changing a cross-sectional area of the intake passage 30 at the position where the intake shutter valve 37 is disposed. Moreover, in the surge tank 34, an intake gas temperature sensor 38 for detecting a temperature of gas to be introduced into the cylinders 2 of the engine 1, and an intake pressure sensor 39 for detecting a pressure of gas to be introduced into the cylinders 2 of the engine 1 are disposed.

An exhaust passage 40 through which exhaust gas from the combustion chambers 6 of the respective cylinders 2 is discharged is connected to the other side face of the engine 1. An upstream part of the exhaust passage 40 is comprised of an exhaust manifold having independent passages extending to the respective cylinders 2 and connected to respective external ends of the exhaust ports 13, and a merging part where the independent passages merge. In a part of the exhaust passage 40 downstream of the exhaust manifold, a turbine 20b of the exhaust turbocharger 20 is disposed. The turbine 20b rotates by the exhaust gas flow, and the compressor 20a coupled to the turbine 20b is operated by the rotation of the turbine 20b.

A VGT (variable-geometry turbocharger) throttle valve 21 is provided in the exhaust passage 40 near the upstream side of the turbine 20b. By controlling an opening (throttle amount) of the VGT throttle valve 21, a flow speed of the exhaust gas to the turbine 20b can be adjusted, and thus, a rotational speed of the turbine 20b which rotates by the exhaust gas flow, in other words, a compression ratio of the compressor 20a of the exhaust turbocharger 20 (a ratio of a gas pressure immediately after flowing out from the compressor 20a with respect to a gas pressure immediately before flowing into the compressor 20a) can be adjusted.

An exhaust emission control system 43 for purifying hazardous components within the exhaust gas is disposed in the exhaust passage 40, downstream of the turbine 20b of the exhaust turbocharger 20. The exhaust emission control system 43 includes a particulate filter 44, an oxidative catalyst 45, and a lean $NO_x$ catalyst 46. The particulate filter 44 captures particulate matters (e.g., soot) within the exhaust gas. The oxidative catalyst 45 is disposed upstream of the particulate filter 44, carries, for example, platinum or a mixture of platinum with palladium, and oxidizes CO and HC (hydrocarbons) within the exhaust gas. The lean $NO_x$ catalyst 46 is disposed downstream of the particulate filter 44, processes (traps) $NO_x$ within the exhaust gas, and suppresses discharge of $NO_x$ to the atmosphere. The particulate filter 44 and the oxidative catalyst 45 are contained in a first case 81. The lean $NO_x$ catalyst 46 is contained in a second case 82, different from the first case 81. The second case 82 is disposed separately to the downstream side from the first case 81.

The engine 1 is configured such that a part of the exhaust gas is recirculated from the exhaust passage 40 to the intake passage 30. A high-pressure EGR passage 50 and a low-pressure EGR passage 60 are provided for the recirculation of the exhaust gas.

The high-pressure EGR passage 50 connects a part of the exhaust passage 40 upstream of the turbine 20b of the exhaust turbocharger 20 to a part of the intake passage 30 downstream of the compressor 20a. More specifically, the high-pressure EGR passage 50 connects a part of the exhaust passage 40 between the exhaust manifold and the turbine 20b of the exhaust turbocharger 20 to a part of the intake passage 30 between the intake shutter valve 37 and the surge tank 34.

The high-pressure EGR passage 50 includes a cooler-side passage 51 for cooling and recirculating the exhaust gas, and a cooler bypass-side passage 52 for recirculating the exhaust gas with its temperature remaining as it is. The cooler-side passage 51 is provided with a high-pressure EGR cooler 53 for cooling the exhaust gas passing thereinside. The cooler bypass-side passage 52 is a passage bypassing the high-pressure EGR cooler 53. Moreover, a cooler-side EGR valve 54 for changing a cross-sectional area of the cooler-side passage 51 is disposed in the cooler-side passage 51 downstream of the high-pressure EGR cooler 53, and a cooler bypass-side EGR valve 55 for changing a cross-sectional area of the cooler bypass-side passage 52 is disposed in the cooler bypass-side passage 52. The cooler-side EGR valve 54 and the cooler bypass-side EGR valve 55 together configure a high-pressure EGR valve and adjust the amount of exhaust gas recirculated by the high-pressure EGR passage 50 (the cooler-side passage 51 and the cooler bypass-side passage 52).

The low-pressure EGR passage 60 connects a part of the exhaust passage 40 downstream of the turbine 20b to a part of the intake passage 30 upstream of the compressor 20a. More specifically, the low-pressure EGR passage 60 connects a part of the exhaust passage 40 between the particulate filter 44 and the lean $NO_x$ catalyst 46 (a part between the first case 81 and the second case 82) to a part of the intake passage 30 between the airflow sensor 32 and the compressor 20a. A low-pressure EGR cooler 61 for cooling the exhaust gas passing thereinside is disposed in the low-pressure EGR passage 60. Moreover, a low-pressure EGR valve 62 for changing a cross-sectional area of the low-pressure EGR passage 60 is disposed in the low-pressure EGR passage 60 downstream of the low-pressure EGR cooler 61.

An exhaust shutter valve 48 is disposed in the exhaust passage 40 downstream of the connected part to the low-pressure EGR passage 60 (and upstream of the lean $NO_x$ catalyst 46). The exhaust shutter valve 48 changes a cross-sectional area of the part of the exhaust passage 40 where the exhaust shutter valve 48 is disposed, and when the cross-sectional area becomes smaller (an opening of the exhaust shutter valve 48 becomes smaller), a pressure in the part of the exhaust passage 40 connected to the low-pressure EGR passage 60 increases and a pressure difference between the exhaust passage 40 side and the intake passage 30 side of the low-pressure EGR valve 62 in the low-pressure EGR passage 60 becomes large. Therefore, by controlling an opening of the low-pressure EGR valve 62 and the opening of the exhaust shutter valve 48, the amount of exhaust gas recirculated by the low-pressure EGR passage 60 is adjusted. Note that the exhaust shutter valve 48 is not necessarily required, and it may be omitted.

Moreover, an exhaust pressure sensor 41 for detecting a pressure of the exhaust gas discharged from the engine 1 is disposed in the exhaust passage 40 near the upstream side of the connected part to the high-pressure EGR passage 50.

Figure 2:
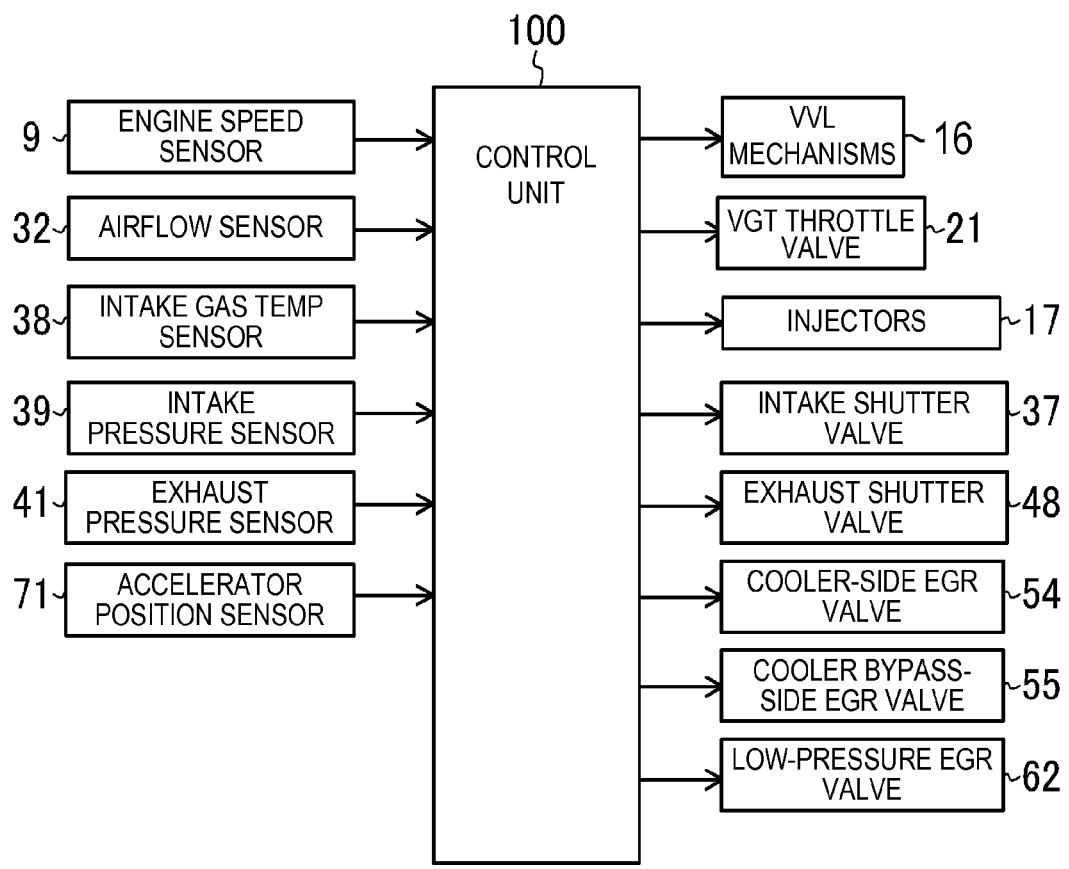
FIG. 2 is a block diagram illustrating a configuration of a control system of the exhaust gas recirculation control device.

As illustrated in FIG. 2, signals of values of sensors including the engine speed sensor 9, the airflow sensor 32, the intake gas temperature sensor 38, the intake pressure sensor 39, the exhaust pressure sensor 41, and an accelerator position sensor 71 for detecting an accelerator position are inputted to a control unit 100 for controlling the engine 1.

The control unit 100 is a controller based on a well-known microcomputer, and includes a central processing unit (CPU) for executing program(s), a memory comprised of, for example, a RAM and/or a ROM and for storing the program(s) and data, and an input/output (I/O) bus for inputting and outputting electric signals.

Further, based on the input signals, the control unit 100 controls the VVLs 16, the injectors 17, the VGT throttle valve 21, the intake shutter valve 37, the exhaust shutter valve 48, the cooler-side EGR valve 54, the cooler bypass-side EGR valve 55, and the low-pressure EGR valve 62.

According to an operating state of the engine 1, the control unit 100 determines a low-pressure EGR target recirculation amount which is a target value of the amount of exhaust gas recirculated by the low-pressure EGR passage 60, and a high-pressure EGR target recirculation amount which is a target value of the amount of exhaust gas recirculated by the high-pressure EGR passage 50. In this embodiment, based on the signals from the engine speed sensor 9 and the accelerator position sensor 71, in other words, based on an engine speed Ne and an engine load PE, the control unit 100 determines the low-pressure EGR target recirculation amount and the high-pressure EGR target recirculation amount, according to the map in FIG. 3.

An "LP" region of the map where either one of the engine load and the engine speed is high is a region where the exhaust gas is recirculated only by the low-pressure EGR passage 60. In the "LP" region of the map, the low-pressure EGR target recirculation amount is set in advance based on the engine speed Ne and the engine load PE, and the high-pressure EGR target recirculation amount is set to zero in advance. Thus, the cooler-side EGR valve 54 and the cooler bypass-side EGR valve 55 are fully closed so that all the exhaust gas is led to the turbine 20b of the exhaust turbocharger 20 and turbocharged in a high engine load range where a high torque is needed.

A "cooler-side HP+LP" region of the map where either one of the engine load and the engine speed is medium is a region where the exhaust gas is recirculated by the cooler-side passage 51 of the high-pressure EGR passage 50 and the low-pressure EGR passage 60, but not by the cooler bypass-side passage 52 (the cooler bypass-side EGR valve 55 is fully closed). In the "cooler-side HP+LP" region of the map, the low-pressure EGR target recirculation amount and the high-pressure EGR target recirculation amount are set in advance based on the engine speed Ne and the engine load PE.

A "cooler bypass-side HP+LP" region of the map where either one of the engine load and the engine speed is low is a region where the exhaust gas is recirculated by the cooler bypass-side passage 52 of the high-pressure EGR passage 50 and the low-pressure EGR passage 60, but not by the cooler-side passage 51 (the cooler-side EGR valve 54 is fully closed). In the "cooler bypass-side HP+LP" region of the map, the low-pressure EGR target recirculation amount and the high-pressure EGR target recirculation amount are set in advance based on the engine speed Ne and the engine load PE.

The control unit 100 controls the openings of the low-pressure EGR valve 62, the exhaust shutter valve 48, the cooler-side EGR valve 54, and the cooler bypass-side EGR valve 55 so that the amounts of exhaust gas recirculated by the low-pressure and high-pressure EGR passages 60 and 50 become the low-pressure and high-pressure EGR target recirculation amounts set in advance in the map, respectively. Thus, the control unit 100 configures a valve control device.

In this embodiment, the control unit 100 performs failure diagnoses of the low-pressure EGR valve 62 (including the exhaust shutter valve 48) and the high-pressure EGR valve (the cooler-side EGR valve 54 and the cooler bypass-side EGR valve 55).

Specifically, while the engine is in a normal operation, when the exhaust gas is recirculated by the low-pressure and high-pressure EGR passages 60 and 50 (when the operating state of the engine 1 is in either one of the "cooler-side HP+LP" region and the "cooler bypass-side HP+LP" region of the map), the control unit 100 calculates an intake gas fill amount to be introduced into the engine 1 based on the gas temperature detected by the intake gas temperature sensor 38 and the gas pressure detected by the intake pressure sensor 39. The intake gas fill amount is the sum of an amount of fresh air introduced into the intake passage 30 and the amount of exhaust gas recirculated from the exhaust passage 40 to the intake passage 30 (in the either one of the "cooler-side HP+LP" region and the "cooler bypass-side HP+LP" region, the exhaust gas recirculated by the low-pressure and high-pressure EGR passages 60 and 50). The intake gas fill amount corresponds to a total amount of intake gas introduced into the engine 1, and the flow rate of intake air detected by the airflow sensor 32 corresponds to the fresh air amount. Therefore, the intake gas temperature sensor 38 and the intake pressure sensor 39 configure a total intake gas amount detector for detecting the total amount of intake gas introduced into the engine 1, and the airflow sensor 32 configures a fresh air amount detector for detecting the amount of fresh air introduced into the engine 1.

Further, the control unit 100 determines whether an actual total recirculation amount calculated by subtracting the fresh air amount from the total intake gas amount (the sum of the fresh air amount and a total amount of exhaust gas recirculated by the low-pressure and high-pressure EGR passages) is normal/abnormal, by comparing the actual total recirculation amount with a total target recirculation amount that is the sum of the low-pressure and high-pressure EGR target recirculation amounts. The reliability of this determination is high.

Moreover, while the engine 1 is in the normal operation, when the exhaust gas is recirculated by the low-pressure and high-pressure EGR passages 60 and 50, the control unit 100 calculates an actual high-pressure recirculation amount based on a difference between a gas pressure detected by the exhaust pressure sensor 41 and a gas pressure detected by the intake pressure sensor 39, and also an actual opening of the high-pressure EGR valve (the cooler-side EGR valve 54 in the "cooler-side HP+LP" region, and the cooler bypass-side EGR valve 55 in the "cooler bypass-side HP+LP" region). The information on the actual opening of the high-pressure EGR valve is obtained by an actuator for driving the high-pressure EGR valve. This gas pressure difference corresponds to a pressure difference between the exhaust passage 40 side and the intake passage 30 side of the high-pressure EGR valve in the high-pressure EGR passage 50. Thus, the intake pressure sensor 39 and the exhaust pressure sensor 41 configure a pressure difference detector.

Further, the control unit 100 provisionally determines whether the actual high-pressure recirculation amount is normal/abnormal by comparing the actual high-pressure recirculation amount with the high-pressure EGR target recirculation amount. Here, the accuracy of the actual high-pressure recirculation amount calculated as described above is low since the gas pressure detected by the exhaust pressure sensor 41 varies greatly due to exhaust gas pulsation, and therefore, the determination of whether the actual high-pressure recirculation amount is normal/abnormal based on the actual high-pressure recirculation amount is a provisional determination at this point.

Furthermore, while the engine 1 is in the normal operation, when the exhaust gas is recirculated only by the low-pressure EGR passage 60 (when the operating state of the engine 1 is in the "LP" region of the map), the control unit 100 calculates the intake gas fill amount to be introduced into the engine 1, in other words, the total intake gas amount (the sum of the fresh air amount and the amount of exhaust gas recirculated by the low-pressure EGR passage) based on the gas temperature detected by the intake gas temperature sensor 38 and the gas pressure detected by the intake pressure sensor 39. Then, the control unit 100 determines whether an actual low-pressure recirculation amount calculated by subtracting the flow rate of intake air detected by the airflow sensor 32, in other words, the fresh air amount, from the total intake gas amount, is normal/abnormal by comparing the actual low-pressure recirculation amount with the low-pressure EGR target recirculation amount. The reliability of this determination is high.

Then, based on the determination result of whether the actual total recirculation amount is normal/abnormal and the determination result of whether the actual low-pressure recirculation amount is normal/abnormal, the control unit 100 reviews the provisional determination result of whether the actual high-pressure recirculation amount is normal/abnormal, and performs a non-provisional determination of whether the actual high-pressure recirculation amount is normal/abnormal. Specifically, the non-provisional determination is performed for Patterns 1 to 10 in Table 1, as described in the column of "Actual High-pressure Recirculation Amount (Non-provisional Determination)."

TABLE 1

| | Actual Total Recirculation Amount | Actual High-pressure Recirculation Amount (Provisional Determination) | Actual Low-pressure Recirculation Amount | Actual High-pressure Recirculation Amount (Non-provisional Determination) |
|---|---|---|---|---|
| 1 | Normal | Normal | Normal | Normal |
| 2 | Normal | Normal | Abnormal | Abnormal |
| 3 | Normal | Abnormal | Normal | Normal |
| 4 | Normal | Abnormal | Abnormal | Abnormal |
| 5 | Abnormal | Normal | Normal | Abnormal |
| 6 | Abnormal | Normal | Abnormal (Same Direction) | Normal |
| 7 | Abnormal | Normal | Abnormal (Opposite Direction) | Abnormal |
| 8 | Abnormal | Abnormal | Normal | Abnormal |
| 9 | Abnormal | Abnormal | Abnormal (Same Direction) | Normal |
| 10 | Abnormal | Abnormal | Abnormal (Opposite Direction) | Abnormal |

Pattern 1 is a case where the actual total recirculation amount is determined as normal, the actual high-pressure recirculation amount is provisionally determined as normal, and the actual low-pressure recirculation amount is determined as normal. In Pattern 1, since both of the actual total recirculation amount and the actual low-pressure recirculation amount are normal, the actual high-pressure recirculation amount should be normal. Since the actual high-pressure recirculation amount is provisionally determined as normal, in the non-provisional determination, it is determined as normal without correcting the provisional determination result.

Pattern 2 is a case where the actual total recirculation amount is determined as normal, the actual high-pressure recirculation amount is provisionally determined as normal, and the actual low-pressure recirculation amount is determined as abnormal. In Pattern 2, since the actual total recirculation amount is normal and the actual low-pressure recirculation amount is abnormal, the actual high-pressure recirculation amount should be abnormal; however, the provisional determination result of the actual high-pressure recirculation amount is normal. Since the reliabilities of the determination results of the actual total recirculation amount and the actual low-pressure recirculation amount are high, the provisional determination result that the actual high-pressure recirculation amount is normal is corrected to be abnormal. Note that in the case where both of the actual low-pressure recirculation amount and the actual high-pressure recirculation amount are abnormal, the actual total recirculation amount may be determined to be normal when the actual low-pressure recirculation amount is smaller than the low-pressure EGR target recirculation amount and the actual high-pressure recirculation amount is larger than the high-pressure EGR target recirculation amount or when the actual low-pressure recirculation amount is larger than the low-pressure EGR target recirculation amount and the actual high-pressure recirculation amount is smaller than the high-pressure EGR target recirculation amount, and Pattern 2 corresponds to such a case.

Pattern 3 is a case where the actual total recirculation amount is determined as normal, the actual high-pressure recirculation amount is provisionally determined as abnormal, and the actual low-pressure recirculation amount is determined as normal. In Pattern 3, since both of the actual total recirculation amount and the actual low-pressure recirculation amount are normal, the actual high-pressure recirculation amount should be normal; however, the provisional determination result of the actual high-pressure recirculation amount is abnormal. Thus, the provisional determination result that the actual high-pressure recirculation amount is abnormal is corrected to be normal.

Pattern 4 is a case where the actual total recirculation amount is determined as normal, the actual high-pressure recirculation amount is provisionally determined as abnormal, and the actual low-pressure recirculation amount is determined as abnormal. In Pattern 4, since the actual total recirculation amount is normal and the actual low-pressure recirculation amount is abnormal, similar to Pattern 2, the actual high-pressure recirculation amount should be abnormal. Since the actual high-pressure recirculation amount is provisionally determined as abnormal, in the non-provisional determination, it is determined as abnormal without correcting the provisional determination result.

Pattern 5 is a case where the actual total recirculation amount is determined as abnormal, the actual high-pressure recirculation amount is provisionally determined as normal, and the actual low-pressure recirculation amount is determined as normal. In Pattern 5, since the actual total recirculation amount is abnormal and the actual low-pressure recirculation amount is normal, the actual high-pressure recirculation amount should be abnormal; however, the provisional determination result of the actual high-pressure recirculation amount is normal. Thus, the provisional determination result that the actual high-pressure recirculation amount is normal is corrected to be abnormal.

Pattern 6 is a case where the actual total recirculation amount is determined as abnormal, the actual high-pressure recirculation amount is provisionally determined as normal, the actual low-pressure recirculation amount is determined as abnormal, when the actual total recirculation amount is smaller than the total target recirculation amount and the actual low-pressure recirculation amount is smaller than the low-pressure EGR target recirculation amount, or when the actual total recirculation amount is larger than the total target recirculation amount and the actual low-pressure recirculation amount is larger than the low-pressure EGR target recirculation amount (a direction to which the actual total recirculation amount deviates from the total target recirculation amount and a direction to which the actual low-pressure recirculation amount deviates from the low-pressure EGR target recirculation amount are the same). In Pattern 6, since the actual low-pressure recirculation amount is smaller (or larger) than the low-pressure EGR target recirculation amount, the actual total recirculation amount is considered to be smaller (or larger) than the total target recirculation amount; thereby, there is a high possibility that the actual high-pressure recirculation amount is normal. Thus, in the non-provisional determination, it is determined as normal without correcting the provisional determination result.

Pattern 7 is a case where the actual total recirculation amount is determined as abnormal, the actual high-pressure recirculation amount is provisionally determined as normal, the actual low-pressure recirculation amount is determined as abnormal, when the actual total recirculation amount is smaller than the total target recirculation amount and the actual low-pressure recirculation amount is larger than the low-pressure EGR target recirculation amount, or when the actual total recirculation amount is larger than the total target recirculation amount and the actual low-pressure recirculation amount is smaller than the low-pressure EGR target recirculation amount (the direction to which the actual total recirculation amount deviates from the total target recirculation amount and the direction to which the actual low-pressure recirculation amount deviates from the low-pressure EGR target recirculation amount are opposite). Specifically, when both of the actual total recirculation amount and the actual low-pressure recirculation amount are abnormal, the actual total recirculation amount is smaller than the total target recirculation amount, and the actual low-pressure recirculation amount is larger than the low-pressure EGR target recirculation amount, the actual high-pressure recirculation amount should be significantly smaller than the high-pressure EGR target recirculation amount and be abnormal. Alternatively, when both of the actual total recirculation amount and the actual low-pressure recirculation amount are abnormal, and the actual total recirculation amount is larger than the total target recirculation amount and, the actual low-pressure recirculation amount is smaller than the low-pressure EGR target recirculation amount, the actual high-pressure recirculation amount should be significantly larger than the high-pressure EGR target recirculation amount and be abnormal; however, the provisional determination result of the actual high-pressure recirculation amount is normal. Thus, in Pattern 7, the provisional determination result that the actual high-pressure recirculation amount is normal is corrected to be abnormal.

Pattern 8 is a case where the actual total recirculation amount is determined as abnormal, the actual high-pressure recirculation amount is provisionally determined as abnormal, and the actual low-pressure recirculation amount is determined as normal. In Pattern 8, since the actual total recirculation amount is abnormal and the actual low-pressure recirculation amount is normal, the actual high-pressure recirculation amount should be abnormal. Since the actual high-pressure recirculation amount is provisionally determined as abnormal, in the non-provisional determination, it is determined as abnormal without correcting the provisional determination result.

Pattern 9 is a case where the actual total recirculation amount is determined as abnormal, the actual high-pressure recirculation amount is provisionally determined as abnormal, the actual low-pressure recirculation amount is determined as abnormal, when the actual total recirculation amount is smaller than the total target recirculation amount and the actual low-pressure recirculation amount is smaller than the low-pressure EGR target recirculation amount, or when the actual total recirculation amount is larger than the total target recirculation amount and the actual low-pressure recirculation amount is larger than the low-pressure EGR target recirculation amount (the direction to which the actual total recirculation amount deviates from the total target recirculation amount and the direction to which the actual low-pressure recirculation amount deviates from the low-pressure EGR target recirculation amount are the same). In Pattern 9, similar to Pattern 6, since the actual low-pressure recirculation amount is smaller (or larger) than the low-pressure EGR target recirculation amount, the actual total recirculation amount is considered to be smaller (or larger) than the total target recirculation amount; thereby, there is a high possibility that the actual high-pressure recirculation amount is normal. Thus, in the non-provisional determination, the provisional determination result that the actual high-pressure recirculation amount is abnormal is corrected to be normal.

Pattern 10 is a case where the actual total recirculation amount is determined as abnormal, the actual high-pressure recirculation amount is provisionally determined as abnormal, the actual low-pressure recirculation amount is determined as abnormal, when the actual total recirculation amount is smaller than the total target recirculation amount and the actual low-pressure recirculation amount is larger than the low-pressure EGR target recirculation amount, or when the actual total recirculation amount is larger than the total target recirculation amount and the actual low-pressure recirculation amount is smaller than the low-pressure EGR target recirculation amount (the direction to which the actual total recirculation amount deviates from the total target recirculation amount and the direction to which the actual low-pressure recirculation amount deviates from the low-pressure EGR target recirculation amount are opposite). Specifically, similar to Pattern 7, when both of the actual total recirculation amount and the actual low-pressure recirculation amount are abnormal, the actual total recirculation amount is smaller than the total target recirculation amount and the actual low-pressure recirculation amount is larger than the low-pressure EGR target recirculation amount, the actual high-pressure recirculation amount should be significantly smaller than the high-pressure EGR target recirculation amount and be abnormal. Alternatively, when both of the actual total recirculation amount and the actual low-pressure recirculation amount are abnormal, the actual total recirculation amount is larger than the total target recirculation amount and the actual low-pressure recirculation amount is smaller than the low-pressure EGR target recirculation amount, the actual high-pressure recirculation amount should be significantly larger than the high-pressure EGR target recirculation amount and be abnormal. Thus, in Pattern 10, in the non-provisional determination, it is determined as abnormal without correcting the provisional determination result.

In the case where the actual low-pressure recirculation amount is determined to be abnormal, the control unit 100 determines that the low-pressure EGR valve 62 (and/or the exhaust shutter valve 48) is abnormal, and stores this information in the memory. Further, in the case where the actual high-pressure recirculation amount is determined as abnormal in the non-provisional determination, when the determination of whether the actual total recirculation amount is normal/abnormal is performed in the "cooler-side HP+LP" region, the cooler-side EGR valve 54 is determined as abnormal, and this information is stored in the memory; whereas, when the determination of whether the actual total recirculation amount is normal/abnormal is performed in the "cooler bypass-side HP+LP" region, the cooler bypass-side EGR valve 55 is determined as abnormal, and this information is stored in the memory. In cases of maintenance and repair of the vehicle, a service person can find out that the low-pressure EGR valve 62 (the exhaust shutter valve 48), the cooler-side EGR valve 54, and/or the cooler bypass-side EGR valve 55 are broken, by reading the stored data.

Figure 4:
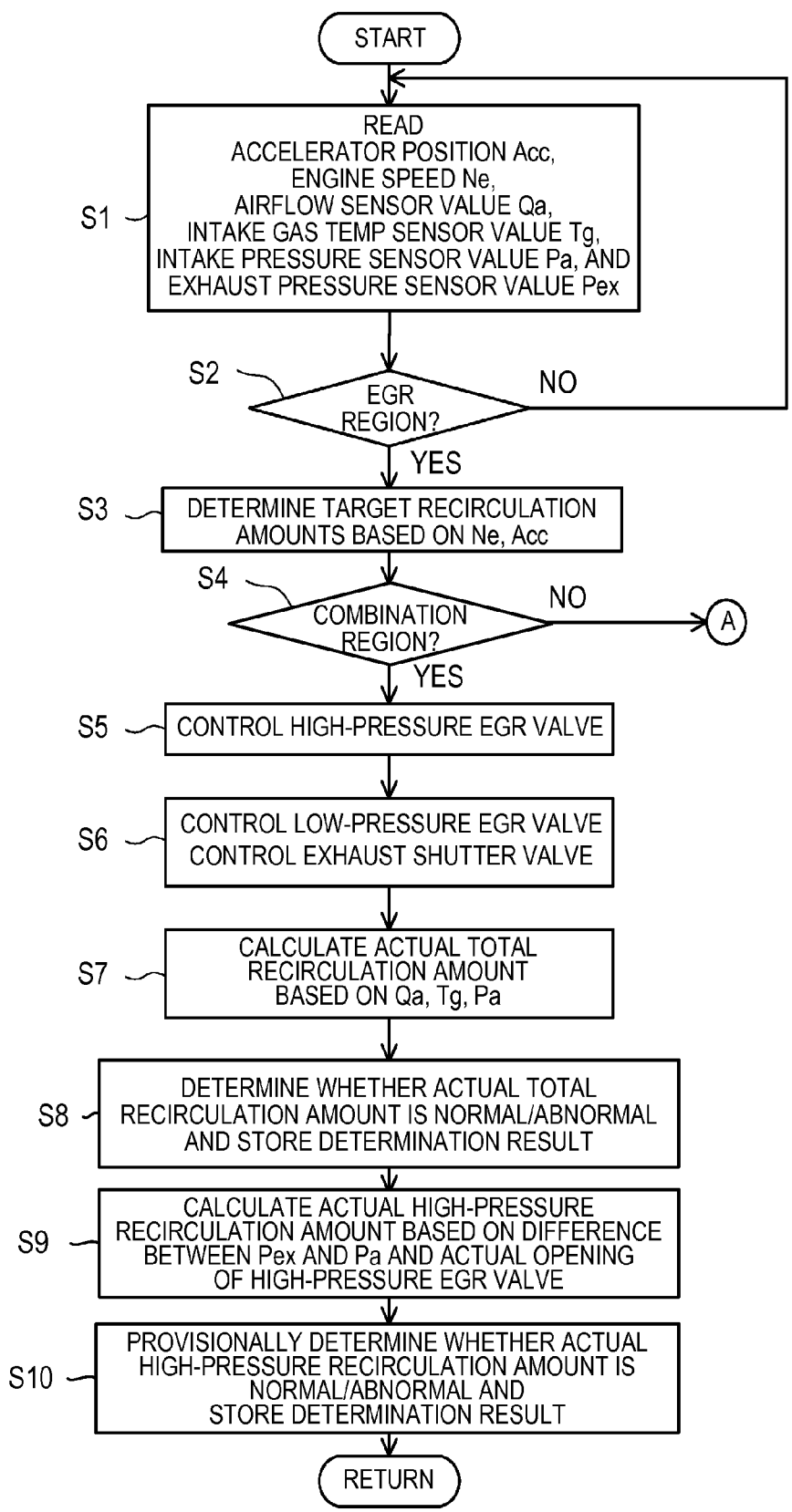
FIG. 4 is a flowchart illustrating a part of control operation of failure diagnoses of a low-pressure EGR valve (including an exhaust shutter valve) and a high-pressure EGR valve (a cooler-side EGR valve and a cooler bypass-side EGR valve), performed by a control unit.
Figure 5:
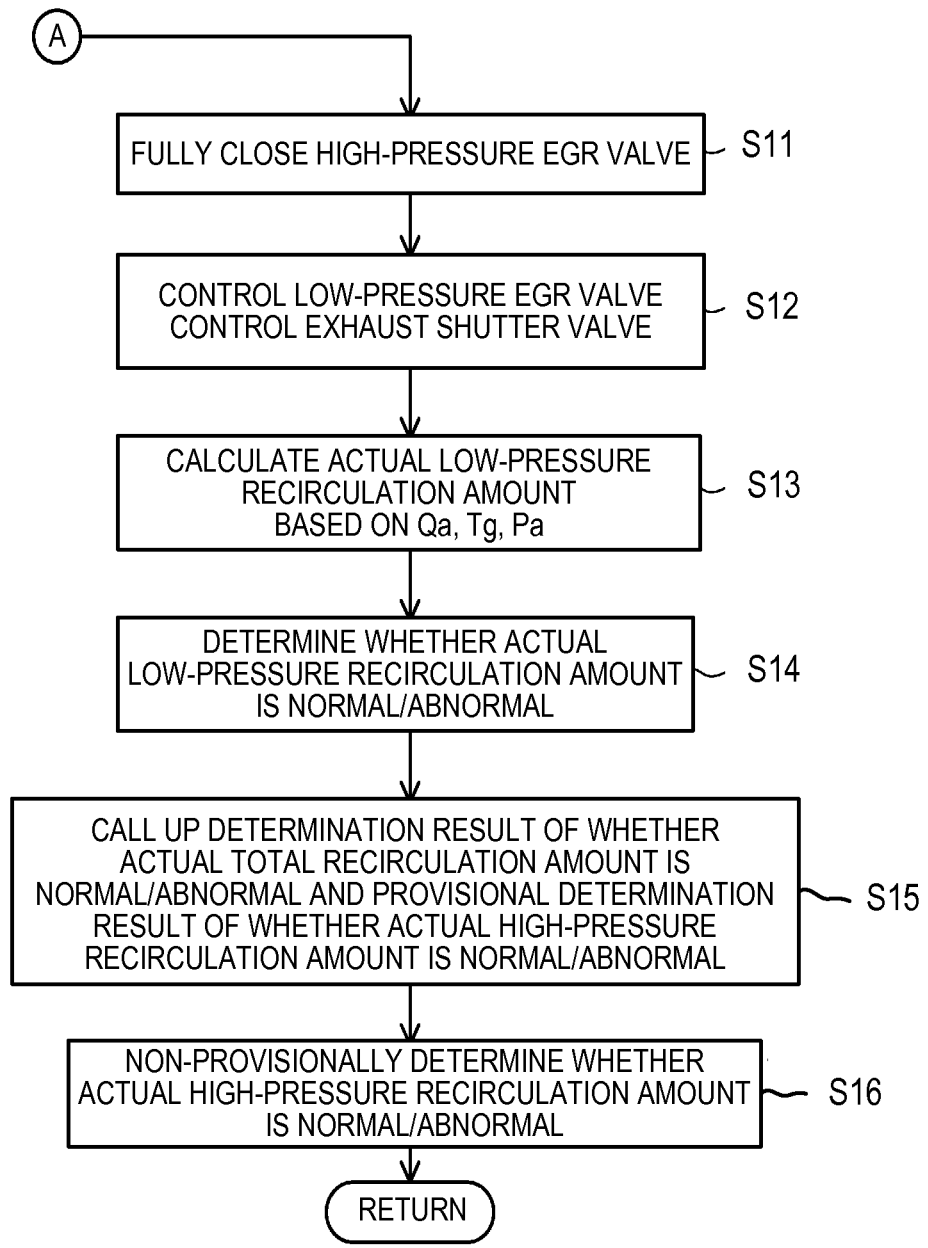
FIG. 5 is a flowchart illustrating the rest of the control operation of the failure diagnoses of the low-pressure EGR valve (including the exhaust shutter valve) and the high-pressure EGR valve (the cooler-side EGR valve and the cooler bypass-side EGR valve), performed by the control unit.

Here, the control operation of the failure diagnoses of the low-pressure EGR valve 62 (including the exhaust shutter valve 48) and the high-pressure EGR valve (the cooler-side EGR valve 54, and the cooler bypass-side EGR valve 55) performed by the control unit 100 is described based on the flowcharts in FIGS. 4 and 5.

First, at S1, an accelerator position Acc from the accelerator position sensor 71, the engine speed Ne from the engine speed sensor 9, a sensor value Qa from the airflow sensor 32, a sensor value Tg from the intake gas temperature sensor 38, a sensor value Pa from the intake pressure sensor 39, and a sensor value Pex from the exhaust pressure sensor 41 are read.

Figure 3:
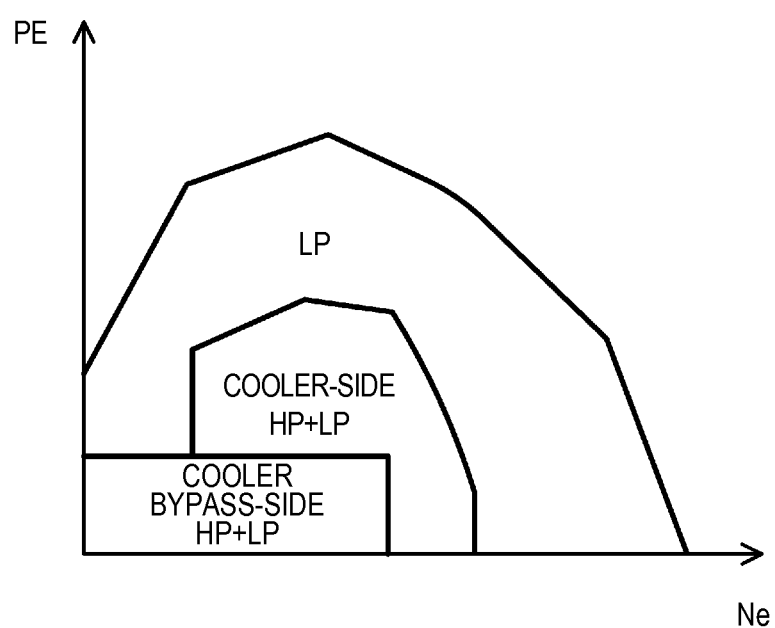
FIG. 3 is a view illustrating a map for determining a low-pressure EGR target recirculation amount and a high-pressure EGR target recirculation amount based on an engine speed and an engine load.

Next, at S2, based on the engine speed Ne and the accelerator position Acc (corresponding to the engine load PE), whether the operating state of the engine 1 is in the EGR region where the recirculation of the exhaust gas is performed (any one of the "LP" region, the "cooler-side HP+LP" region, and the "cooler bypass-side HP+LP" region) is determined according to the map in FIG. 3.

Sequentially, at S3, based on the engine speed Ne and the accelerator position Acc (the engine load PE), the low-pressure and high-pressure EGR target recirculation amounts (and the total target recirculation amount which is the sum of the low-pressure EGR target recirculation amount and the high-pressure EGR target recirculation amount) are determined according to the map in FIG. 3. Note that, in the "LP" region, the high-pressure EGR target recirculation amount becomes zero.

Next, at S4, whether the operating state of the engine 1 is in a combination region where the recirculation of the exhaust gas by the high-pressure and low-pressure EGR passages 50 and 60 is performed (either one of the "cooler-side HP+LP" region and the "cooler bypass-side HP+LP" region) is determined. If the result at S4 is positive, the operation proceeds to S5; whereas if the result at S4 is negative, the operation proceeds to S11.

At S5, the opening of the high-pressure EGR valve (either one of the cooler-side EGR valve 54 and the cooler bypass-side EGR valve 55) is controlled based on the difference between the exhaust pressure sensor value Pex and the intake pressure sensor value Pa (Pex-Pa), and the high-pressure EGR target recirculation amount. Note that in the "cooler-side HP+LP" region, the cooler bypass-side EGR valve 55 is fully closed, and in the "cooler bypass-side HP+LP" region, the cooler-side EGR valve 54 is fully closed.

Next, at S6, the openings of the low-pressure EGR valve 62 and the exhaust shutter valve 48 are controlled to openings corresponding to the low-pressure EGR target recirculation amount.

Sequentially, at S7, while the engine 1 is in the normal operation, based on the airflow sensor value Qa, the intake gas temperature sensor value Tg, and the intake pressures sensor value Pa, the actual total recirculation amount is calculated by subtracting the fresh air amount from the total intake gas amount (the sum of the fresh air amount and the total amount of exhaust gas recirculated by the low-pressure and high-pressure EGR passages 60 and 50).

Next, at S8, whether the actual total recirculation amount is normal/abnormal is determined by comparing the actual total recirculation amount with the total target recirculation amount, and the determination result is fixed and stored in the memory.

Sequentially, at S9, while the engine 1 is in the normal operation, the actual high-pressure recirculation amount is calculated based on the difference between the exhaust pressure sensor value Pex and the intake pressure sensor value Pa, and the actual opening of the high-pressure EGR valve (either one of the cooler-side EGR valve 54 and the cooler bypass-side EGR valve 55).

Next, at S10, whether the actual high-pressure recirculation amount is normal/abnormal is provisionally determined by comparing the actual high-pressure recirculation amount with the high-pressure EGR target recirculation amount, and the provisional determination result is stored in the memory, and the operation returns back to START[ipto1] thereafter.

At S11 to which the operation proceeds if the result at S4 is negative, the high-pressure EGR valve (the cooler-side EGR valve 54 and the cooler bypass-side EGR valve 55) is fully closed, and next at S12, the openings of the low-pressure EGR valve 62 and the exhaust shutter valve 48 are controlled to the openings corresponding to the low-pressure EGR target recirculation amount.

Next, at S13, while the engine 1 is in the normal operation, based on the airflow sensor value Qa, the intake gas temperature sensor value Tg, and the intake pressure sensor value Pa, the actual low-pressure recirculation amount is calculated by subtracting the fresh air amount from the total intake gas amount (the sum of the fresh air amount and the amount of exhaust gas recirculated by the low-pressure EGR passage 60).

Next, at S14, whether the actual low-pressure recirculation amount is normal/abnormal is determined by comparing the actual low-pressure recirculation amount with the low-pressure EGR target recirculation amount, and the determination result is fixed.

Sequentially, at S15, the determination result of whether the actual total recirculation amount is normal/abnormal and the provisional determination result of whether the actual high-pressure recirculation amount is normal/abnormal are recalled.

Next, at S15, the provisional determination result of whether the actual high-pressure recirculation amount is normal/abnormal is reviewed based on the determination result of whether the actual total recirculation amount is normal/abnormal and the determination result of whether the actual low-pressure recirculation amount is normal/abnormal, and the non-provisional determination is performed, and the operation returns back to START[ipto2] thereafter.

Therefore, in this embodiment, when the exhaust gas is recirculated by the low-pressure and high-pressure EGR passages 60 and 50, whether the actual total recirculation amount calculated by subtracting the fresh air amount from the total intake gas amount is normal/abnormal is determined and whether the actual high-pressure recirculation amount is normal/abnormal is provisionally determined. Note that the actual high-pressure recirculation amount is calculated based on the pressure difference between the exhaust passage 40 side and the intake passage 30 side of the high-pressure EGR valve in the high-pressure EGR passage 50 and the actual opening of the high-pressure EGR valve (either one of the cooler-side EGR valve 54 and the cooler bypass-side EGR valve 55). When the exhaust gas is recirculated only by the low-pressure EGR passage 60, whether the actual low-pressure recirculation amount calculated by subtracting the fresh air amount from the total intake gas amount is normal/abnormal is determined, the provisional determination result of whether the actual high-pressure recirculation amount is normal/abnormal is reviewed based on the determination result of whether the actual total recirculation amount is normal/abnormal and the determination result of whether the actual low-pressure recirculation amount is normal/abnormal, and whether the actual high-pressure recirculation amount is normal/abnormal is non-provisionally determined. Thus, the reliability of the determination of whether the actual high-pressure recirculation amount is normal/abnormal, in other words, the reliability of the failure diagnosis of the high-pressure EGR valve (the cooler-side EGR valve 54 and the cooler bypass-side EGR valve 55) can be improved to an equivalent level to the reliability of determination of whether the actual low-pressure recirculation amount is normal/abnormal, in other words, the reliability of the failure diagnosis of the low-pressure EGR valve 62.

The present invention is not limited to this embodiment, and may be modified without deviating from the spirit and scope of the claims.

For example, in this embodiment, only one exhaust turbocharger 20 is provided for the engine 1; however, two or more exhaust turbochargers may be provided. In this case, the low-pressure EGR passage 60 connects a part of the exhaust passage 40 downstream of the turbine which is positioned the furthest downstream among all the turbines, to a part of the intake passage 30 upstream of the compressor which is positioned the furthest upstream among all the compressors. Moreover, the high-pressure EGR passage 50 connects a part of the exhaust passage 40 upstream of the turbine which is positioned the furthest upstream among all the turbines, to a part of the intake passage 30 downstream of the compressor which is positioned the furthest downstream among all the compressors.

The above-described embodiment is merely an illustration, and therefore, it must not be interpreted in a limiting manner. The scope of the present invention is defined by the following claims, and all of modifications and changes falling under the equivalent range of the claims are within the scope of the present invention.

The present invention is effective in performing failure diagnoses of a high-pressure EGR valve and a low-pressure EGR valve of an exhaust gas recirculation control device of an engine. The exhaust gas recirculation control device includes an exhaust turbocharger having a turbine disposed in an exhaust passage of the engine and a compressor disposed in an intake passage, a low-pressure EGR passage connecting a part of the exhaust passage downstream of the turbine to a part of the intake passage upstream of the compressor, the low-pressure EGR valve disposed in the low-pressure EGR passage and for changing a cross-sectional area of the low-pressure EGR passage, a high-pressure EGR passage connecting a part of the exhaust passage upstream of the turbine to a part of the intake passage downstream of the compressor, the high-pressure EGR valve disposed in the high-pressure EGR passage and for changing a cross-sectional area of the high-pressure EGR passage, and a valve control device for controlling openings of the low-pressure EGR valve so that an amount of exhaust gas of the engine recirculated by the low-pressure EGR passage becomes a low-pressure EGR target recirculation amount set in advance according to an operating state of the engine, and for controlling the opening of the high-pressure EGR valve so that an amount of exhaust gas recirculated by the high-pressure EGR passage becomes a high-pressure EGR target recirculation amount set in advance according to the operating state of the engine.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

1 Engine
20 Exhaust Turbocharger
20a Compressor
20b Turbine
30 Intake Passage
32 Airflow Sensor (Fresh Air Amount Detector)
38 Intake Gas Temperature Sensor (Total Intake Gas Amount Detector)
39 Intake Pressure Sensor (Total Intake Gas Amount Detector) (Pressure Difference Detector)
40 Exhaust Passage
41 Exhaust Pressure Sensor (Pressure Difference Detector)
48 Exhaust Shutter Valve
50 High-pressure EGR Passage
51 Cooler-side Passage
52 Cooler Bypass-side Passage
54 Cooler-side EGR Valve (High-pressure EGR Valve)
55 Cooler Bypass-side EGR Valve (High-pressure EGR Valve)
60 Low-pressure EGR Passage
62 Low-pressure EGR Valve
100 Control Unit (Valve Control Device)

What is claimed is:

1. A turbocharged internal combustion engine, comprising:
    an exhaust turbocharger having a turbine disposed in an exhaust gas passage of the engine and a compressor disposed in an intake passage;
    a low-pressure EGR passage connecting a part of the exhaust gas passage downstream of the turbine to a part of the intake passage upstream of the compressor;
    a low-pressure EGR valve disposed in the low-pressure EGR passage and for changing a cross-sectional area of the low-pressure EGR passage;
    a high-pressure EGR passage connecting a part of the exhaust gas passage upstream of the turbine to a part of the intake passage downstream of the compressor;
    a high-pressure EGR valve disposed in the high-pressure EGR passage and for changing a cross-sectional area of the high-pressure EGR passage;
    an exhaust shutter valve disposed in the exhaust gas passage and for changing a cross-sectional area of the exhaust gas passage;
    a total intake gas amount detector for detecting a total amount of intake gas introduced into the engine;
    a fresh air amount detector for detecting an amount of fresh air introduced into the engine;
    a pressure difference detector for detecting a pressure difference between the exhaust passage side and the intake passage side of the high-pressure EGR valve in the high-pressure EGR passage; and
    a control unit of controlling openings of the low-pressure EGR valve; the high-pressure EGR valve; and the exhaust shutter valve so that an amount of exhaust gas of the engine recirculated by the low-pressure EGR passage becomes a low-pressure EGR target recirculation amount and an amount of exhaust gas of the engine recirculated by the high-pressure EGR passage becomes a high-pressure EGR target recirculation amount, respectively;
        wherein the low-pressure and high-pressure EGR target recirculation amounts being are set in advance according to an operating state of the engine;
    wherein
        during a normal operation of the engine, the control unit includes executable instructions stored in non-transitory memory of:
            (i) determining whether an actual total recirculation amount is normal/abnormal by comparing the actual total recirculation amount with a total target recirculation amount that is the sum of the low-pressure EGR target recirculation amount and the high-pressure EGR target recirculation amount;
            provisionally determining whether an actual high-pressure recirculation amount is normal/abnormal by comparing the actual high-pressure recirculation amount with the high-pressure EGR target recirculation amount, the actual total recirculation amount calculated by subtracting the fresh air amount detected by the fresh air amount detector, from the total intake gas amount detected by the total intake gas amount detector, the actual high-pressure recirculation amount calculated based on the pressure difference detected by the pressure difference detector and an actual opening of the high pressure EGR valve; and
            opening of the low-pressure EGR valve and the high-pressure EGR valve to recirculate the exhaust gas through both of the low-pressure EGR passage and the high-pressure EGR passage;
            (ii) determining whether an actual low-pressure recirculation amount is normal/abnormal by comparing the actual low-pressure recirculation amount with the low-pressure EGR target recirculation amount;
            calculating the actual low-pressure recirculation amount by subtracting the fresh air amount detected by the fresh air amount detector, from the total intake gas amount detected by the total intake gas amount detector;
            reviewing a provisional determination result of whether the actual high-pressure recirculation amount is normal/abnormal;
            non-provisionally determining whether the actual high-pressure recirculation amount is normal/abnormal based on the determination result of whether the actual total recirculation amount is normal/abnormal and the determination result of whether the actual low-pressure recirculation amount is normal/abnormal; and
            controlling of the low-pressure EGR valve and fully closing both of the high-pressure EGR valve and the exhaust gas shutter valve to recirculate the exhaust gas through only the low-pressure EGR passage.

2. The turbocharged internal combustion engine of claim 1,
    wherein the control unit further includes non-transitory executable instructions to correct the provisional determination result that the actual high-pressure recirculation amount is normal in a non-provisional determination to be abnormal, when:
        the actual total recirculation amount is determined as normal;
        the actual high-pressure recirculation amount is provisionally determined as normal; and the actual low-pressure recirculation amount is determined as abnormal.

3. The turbocharged internal combustion engine of claim 1,
wherein the control unit further includes non-transitory executable instructions to correct the provisional determination result that the actual high-pressure recirculation amount is abnormal in a non-provisional determination to be normal, when:
the actual total recirculation amount is determined as normal;
the actual high-pressure recirculation amount is provisionally determined as abnormal; and
the actual low-pressure recirculation amount is determined as normal.

4. The turbocharged internal combustion engine of claim 1,
wherein the control unit further includes non-transitory executable instructions to correct the provisional determination result that the actual high-pressure recirculation amount is normal in a non-provisional determination to be abnormal, when:
the actual total recirculation amount is determined as abnormal;
the actual high-pressure recirculation amount is provisionally determined as normal; and
the actual low-pressure recirculation amount is determined as normal.

5. The turbocharged internal combustion engine of claim 1,
wherein the control unit further includes non-transitory executable instructions to correct the provisional determination result that the actual high-pressure recirculation amount is normal in a non-provisional determination to be abnormal, when:
the actual low-pressure recirculation amount is determined as abnormal, the actual total recirculation amount is determined as abnormal, and the actual high-pressure recirculation amount is provisionally determined as normal;
when the actual total recirculation amount is smaller than the total target recirculation amount and the actual low-pressure recirculation amount is larger than the low-pressure EGR target recirculation amount; or
when the actual total recirculation amount is larger than the total target recirculation amount and the actual low-pressure recirculation amount is smaller than the low-pressure EGR target recirculation amount.

6. The turbocharged internal combustion engine of claim 1,
wherein the control unit further includes non-transitory executable instructions to correct the provisional determination result that the actual high-pressure recirculation amount is abnormal in a non-provisional determination to be normal, when:
the actual low-pressure recirculation amount is determined as abnormal, the actual total recirculation amount is determined as abnormal, and the actual high-pressure recirculation amount is provisionally determined as abnormal;
when the actual total recirculation amount is smaller than the total target recirculation amount and the actual low-pressure recirculation amount is smaller than the low-pressure EGR target recirculation amount; or
when the actual total recirculation amount is larger than the total target recirculation amount and the actual low-pressure recirculation amount is larger than the low-pressure EGR target recirculation amount.

* * * * *